UNITED STATES PATENT OFFICE.

WILLIAM JUDSON MARSH, OF NIAGARA FALLS, NEW YORK, ASSIGNOR TO HOOKER ELECTROCHEMICAL COMPANY, OF NEW YORK, N. Y., A CORPORATION OF NEW YORK.

PROCESS OF TREATING COPPER-BEARING ALLOYS.

1,353,773.  Specification of Letters Patent.  Patented Sept. 21, 1920.

No Drawing.  Application filed December 8, 1919.  Serial No. 343,214.

*To all whom it may concern:*

Be it known that I, WILLIAM JUDSON MARSH, a citizen of the United States, residing at Niagara Falls, in the county of Niagara and State of New York, have invented certain new and useful Improvements in Processes of Treating Copper-Bearing Alloys, of which the following is a specification.

This invention is a novel process of treating scrap brass and related alloys containing copper for the recovery of the component metals, either as such or in the form of their commercially valuable salts or compounds. The method depends upon the solvent properties of cupric chlorid, and is applicable to the treatment of a wide variety of alloys including yellow or red brass scrap, as well as related alloys, including bronzes, containing tin, aluminum, lead, etc., in varying proportions.

According to the invention the alloy in the form of turnings, borings, punchings, clippings or other waste forms is subjected to the solvent action of a solution containing cupric chlorid, preferably at a temperature decidedly above normal, whereby the component metals are dissolved. In the preferred embodiment of the invention, the solution is maintained at or near its boiling point. Inasmuch as the passage into solution of copper, zinc, etc., is accompanied by a corresponding reduction of cupric chlorid, it is necessary in the commercial practice of the invention to provide for properly maintaining the cupric chlorid content of the solution. This may be accomplished in a variety of ways, as pointed out below.

Example I: Scrap brass in the form of turnings, borings, punchings, clippings, light brass or the like is charged with water into an acid-proof vessel, and gaseous chlorin is delivered beneath the charge. Absorption of chlorin proceeds slowly at first, but as the temperature rises and the cupric chlorid content of the solution increases the absorption becomes more and more rapid, and the reaction ultimately becomes extremely vigorous. The temperature may rise to the boiling point of the solution, and may advantageously be maintained at or near this point, being controlled by regulating the rate of admission of the chlorin. The escaping vapors may be refluxed back into the reaction vessel in case it is desired to avoid concentration of the solution due to evaporation. It is advantageous in practice to add to the solution, or to the water used for preparing the solution, a small proportion of hydrochloric acid in order to prevent hydrolysis of the chlorids of iron and other metals.

The operation may be either continuous or intermittent in type, that is to say, portions of the solution may be withdrawn continuously or from time to time after the desired concentration is reached, and replaced by an equivalent quantity of water or weak hydrochloric acid solution, together with the requisite addition of scrap; or alternatively, a given batch of scrap may be chlorinated and the product discharged, the operation being then repeated.

The product of the chlorination is a solution containing zinc chlorid, cupric chlorid and cuprous chlorid, usually with small proportions of the chlorids of iron, lead, tin, aluminum and such other metals as may have been present in the alloy. The relative proportions of cupric and cuprous chlorids present may vary widely, and can readily be controlled in the practice of the process. For example, by continuing the introduction of chlorin after the supply of brass has become depleted or exhausted, the copper content of the solution may be largely transformed into the cupric salt; or, conversely, by allowing the solution to come into contact with brass after the introduction of chlorin has ceased, its copper content may be largely or wholly transformed to the cuprous salt. In practice, during the continuance of the operation, both cuprous and cupric salts are present. The cuprous salt remains, however, in solution, for although it is substantially insoluble in water, it is more or less freely soluble in many chlorid solutions. The liquid may vary in color from green to brown according to whether cupric or cuprous copper predominates.

If the chlorination be arrested when the solution has attained a density of about 50° Bé., or if the solution be withdrawn at approximately this concentration, it will be found that it can be permitted to cool without substantial deposition of crystals other than lead chlorid. Solutions of materially higher concentration deposit cuprous or cupric chlorid or both, upon cooling.

The solution may be treated for the separation and recovery of copper, zinc, their salts or compounds, or other metals or metallic salts which may be contained therein, by any desired method. For example the bulk of the copper may be precipitated by electrolysis, after which most of the remaining metals may be removed by treatment with metallic zinc, leaving a solution of zinc chlorid. From this solution, after proper purification, zinc and chlorin may be produced by electrolysis either in aqueous solution or in the fused state.

It is not necessary as a rule to agitate the scrap brass by mechanical means during the chlorination, although such agitation may be provided for. In case a tendency is observed to the formation of aggregates, as sometimes occurs, such aggregrates should be broken up at intervals in any convenient way.

The principal reactions which occur may be represented thus:—

(1) Solution of copper:

$$CuCl_2 + Cu = Cu_2Cl_2$$

(2) Solution of zinc:

$$2CuCl_2 + Zn = Cu_2Cl_2 + ZnCl_2$$

(3) Regeneration of solvent:

$$Cu_2Cl_2 + Cl_2 = 2CuCl_2.$$

It will, of course, be understood that other reactions than the above may occur. For example copper may be reduced by zinc to the metallic state, and thereafter re-dissolved by cupric chlorid in accordance with equation (1).

Example II: In the operation as described in Example I the reduction of the cupric chlorid to the cuprous salt, and its regeneration to the cupric state take place in the same apparatus, with the result that a more or less definite equilibrium is attained, depending upon the relative proportions of brass and chlorin. It is, however, entirely feasible to separate, either wholly or to any desired degree, the operations of dissolving the metals and regenerating the solvent. For example a solution containing cupric chlorid may be continuously circulated through the brass scrap, and through an external vessel to which chlorin is supplied. In this case the transformation of the cuprous to the cupric salt (the regeneration of the solvent) takes place out of contact with the alloy to be dissolved. As will readily be understood, any combination of these methods may be used; thus for example the solution may undergo partial regeneration in presence of the metal scrap as in Example I, and partial regeneration out of contact therewith.

Example III: Instead of gaseous chlorin, other reagents capable of effecting the transformation of cuprous chlorid to cupric chlorid may be wholly or partially substituted therefor. Especially mixtures of hydrochloric acid and oxygen or air may be used, in which case the regeneration of the cupric salt may be thus represented:

(4) $Cu_2Cl_2 + 2HCl + O = 2CuCl_2 + H_2O.$

In this case, however, the reaction is decidedly more sluggish than when chlorin is used. Accordingly it is often desirable to accelerate the reaction by supplying chlorin with the hydrochloric acid and oxygen, when proceeding according to this modification of the process.

In any of the several modifications described above, the chlorinating agent (gaseous chlorin, hydrochloric acid and oxygen, or mixtures thereof, etc.) may be introduced into the solution in presence of the alloy to be dissolved; or alternatively, the chlorinating agent may be introduced into the circulating liquid at a point outside of the dissolving vessel. The essential requirement in either case is that the chlorinating agent should be supplied in quantity sufficient to maintain the required solvent power of the solution, and to prevent excessive accumulation of cuprous chlorid.

I claim:—

1. Process of treating copper bearing alloys, comprising reacting thereon with an aqueous solution containing cupric chlorid while maintaining the cupric chlorid content of the solution.

2. Process of treating copper bearing alloys, comprising reacting thereon with an aqueous solution containing cupric chlorid while maintaining the cupric chlorid content of the solution by the addition of chlorin.

3. Process of treating copper bearing alloys, comprising reacting thereon with an aqueous solution containing cupric chlorid in presence of a chlorinating agent serving to maintain the cupric chlorid content of the solution.

In testimony whereof, I affix my signature.

WILLIAM JUDSON MARSH.